United States Patent
Trencher et al.

(10) Patent No.: US 10,740,417 B2
(45) Date of Patent: Aug. 11, 2020

(54) METHODS OF PROVIDING INFORMATION RELATED TO ACTIVITIES

(71) Applicant: MasterCard International Incorporated, Purchase, NY (US)

(72) Inventors: John Trencher, London (GB); Vergari Fabiano, London (GB); Michael Bennett, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 478 days.

(21) Appl. No.: 15/246,072

(22) Filed: Aug. 24, 2016

(65) Prior Publication Data

US 2017/0061022 A1 Mar. 2, 2017

(30) Foreign Application Priority Data

Aug. 25, 2015 (EP) .................................. 15182438

(51) Int. Cl.
| | | |
|---|---|---|
| *G06F 17/00* | (2019.01) | |
| *G06F 16/9535* | (2019.01) | |
| *G06F 16/9537* | (2019.01) | |
| *G06F 16/2457* | (2019.01) | |
| *G06Q 10/02* | (2012.01) | |

(52) U.S. Cl.
CPC .... *G06F 16/9535* (2019.01); *G06F 16/24578* (2019.01); *G06F 16/9537* (2019.01); *G06Q 10/02* (2013.01)

(58) Field of Classification Search
CPC ........... G06F 17/30867; G06F 16/9535; G06F 16/9537; G06F 16/24578; G06Q 10/02
See application file for complete search history.

(56) References Cited

U.S. PATENT DOCUMENTS

| | | | | |
|---|---|---|---|---|
| 8,433,624 | B1* | 4/2013 | Rempe | G06Q 20/322 705/26.1 |
| 2001/0028603 | A1* | 10/2001 | Shimazu | G06F 17/30389 368/10 |
| 2006/0112105 | A1* | 5/2006 | Adamic | G06F 17/30613 |
| 2009/0239552 | A1 | 9/2009 | Churchill et al. | |
| 2009/0319288 | A1* | 12/2009 | Slaney | G06Q 10/10 705/1.1 |
| 2010/0280920 | A1 | 11/2010 | Scott et al. | |
| 2012/0290217 | A1* | 11/2012 | Shoval | G06F 19/3418 702/19 |
| 2013/0054698 | A1 | 2/2013 | Lee et al. | |

(Continued)

FOREIGN PATENT DOCUMENTS

CN 103096242 B 5/2015

OTHER PUBLICATIONS

Extended European Search Report for EP Application No. 15182438.0, dated Jan. 18, 2016, 6 pages.

*Primary Examiner* — Syed H Hasan
(74) *Attorney, Agent, or Firm* — Armstrong Teasdale LLP (57) ABSTRACT

A method of providing a user with information related to one or more activities is provided. The method comprises identifying one or more activities; calculating a locality for the user for each activity; identifying a subset of the activities based on the respective locality for each activity; and providing information related to at least one of the subset of the activities to the user.

18 Claims, 8 Drawing Sheets

(56) References Cited

U.S. PATENT DOCUMENTS

| | | | |
|---|---|---|---|
| 2013/0144818 A1* | 6/2013 | Jebara | G06N 99/005 706/12 |
| 2013/0196689 A1* | 8/2013 | Smith | H04W 4/21 455/456.3 |
| 2014/0136365 A1* | 5/2014 | Nista | G06Q 30/06 705/26.8 |
| 2015/0058324 A1* | 2/2015 | Kauwe | G06Q 50/01 707/722 |
| 2015/0095214 A1* | 4/2015 | Ahn | G06O 20/227 705/39 |
| 2015/0112808 A1* | 4/2015 | Coatney | G06Q 30/0261 705/14.58 |
| 2015/0120019 A1 | 4/2015 | Wisbey et al. | |
| 2015/0278897 A1* | 10/2015 | Nichols | G06Q 30/0639 705/26.41 |
| 2016/0203190 A1* | 7/2016 | Zinger | G01K 1/02 707/749 |

* cited by examiner

METHODS OF PROVIDING INFORMATION RELATED TO ACTIVITIES

CROSS REFERENCE TO RELATED APPLICATIONS

This application claims priority to European Patent Application No. 15182438.0, filed Aug. 25, 2015, entitled "METHODS OF PROVIDING INFORMATION RELATED TO ACTIVITIES", the disclosure of which is hereby incorporated herein by reference in its entirety.

TECHNICAL FIELD

The present invention relates to methods of providing a user with information related to activities, and in particular, information related to activities which are new to the user.

BACKGROUND

A person can often find information about activities, such as on websites. However, this requires the user to search for activities that he or she thinks would likely be of interest. There is no facility for a user to find activities that he or she does not already know about. Moreover, this tends to lead to a high amount of data being transferred to the user's device, much of which is irrelevant or is unlikely to be useful to the user. This can put a strain on limited mobile resources.

In some cases, it is possible to analyze certain activities that a user habitually performs. For example, transaction records are generated when a user uses payment means at certain vendors. Based on this, the user's preferred activities can be generated. However, this similarly fails to consider activities that the user has not already performed.

There is therefore a limited facility for providing a user with information related to activities, particularly where those activities are new to the user, in an efficient manner.

SUMMARY

In a first aspect, there is provided a method of providing a user with information related to one or more activities. The method may be computer-implemented. The method comprises identifying one or more activities and calculating a locality for the user for each activity. A subset of the activities is then identified based on the respective locality for each activity. The user is then provided with information related to at least one of the subset of the activities.

This therefore provides a method for computationally providing information to a user about activities, whereas previously there was no system for doing so. Moreover, the provided activities are limited by locality, thereby only information related to activities which are relevant to the user is presented. This limits the scope of the information that needs to be provided, since there is limited value in providing the user with information related to activities that the user would not perform. Moreover, this reduces the amount of data to be transferred and improves the visual efficiency of the items displayed on a display.

In some embodiments, identifying one or more activities includes comparing the user with one or more other users; identifying a subset of the other users based on the comparison; accessing transaction data associated with each user in the subset of the other users, the transaction data comprising one or more transaction records, each transaction record identifying an activity; and compiling the activities corresponding to at least one transaction record in the transaction data.

Although activities can be identified in many ways, such as by crawling websites, this tends to be computationally difficult, requiring high data processing capabilities as well as processing time. In addition, the data gathered from such sources is of questionable accuracy, since it is possible to have false information on a website. Instead, transaction data relates to activities which have actually been purchased (and are often performed at the time of transaction). Transaction data therefore provides high accuracy information about activities.

In some embodiments, comparing the user with one or more other users includes: accessing first user information related to the user and second user information related to each other user; and assessing a similarity between the user and each other user based on the first user information and the second user information. Identifying a subset of the other users may include determining whether the similarity between the user and each other user is above a threshold. Moreover, identifying a subset of the other users may further include determining whether the similarity between the user and each other user is below a limit. In other words, each similarity must be within a range of "allowable" similarities, defined by the threshold and the limit.

By identifying one or more other relatively similar users, other activities that may be relevant to one user are more easily identified. This is because users who are similar will tend to perform the same activities. In addition, where there is a limit provided, this can be used to ensure that other users who are too similar to the user are excluded. This tends to exclude activities that the user is likely to already know about, on account of being done by similar users. Instead, the systems and methods herein focus on activities that the user is less likely to know about, but that are still likely to be of interest.

In some embodiments, the method further includes: determining if an activity is associated with the user; wherein each activity in the subset of the activities is not associated with the user. This may be accomplished by accessing transaction data associated with the user, the transaction data comprising one or more transaction records, each transaction record identifying an activity; wherein an activity is determined to be associated with the user if there is a transaction record identifying the activity in the transaction data associated with the user.

It is often beneficial to focus on activities that the user does not already know about, as information related to novel activities will often be the most useful. Although this can be achieved by setting a limit for similarity of other users in addition to the threshold similarity of other users, this can be more strongly enforced by explicitly eliminating certain activities. These eliminated activities can be activities that the user has already performed, as indicated by his or her transaction records. Additionally or alternatively, these can be activities that have been performed by other users that have a high similarity to the user. In this manner, only information related to those activities that the user is likely to be interested in (as determined by looking at similar, but not "too similar" other users) and are likely to be novel to the user (as determined by the user's transaction records or other user's transaction records or both) are provided to the user's device. This ensures a reduction in the transfer of information to the user's device that the user already knows, reducing unnecessary consumption of data and processing power, and improving the efficiency of information transmission to the user.

In some embodiments, presenting information related to at least one of the subset of the activities to the user includes: assessing a popularity of each activity; wherein the user is provided with information related to at least one of the subset of activities having a popularity higher than those activities not having information related thereto presented to the user.

In this manner, the (relatively) most popular activities are presented to the user. This helps to improve the chance that the initially transmitted information will be useful, therefore potentially reducing the total information transmitted to the user.

The popularity of each activity can be assessed by: determining the number of transaction records linked to unique users which are related to the activity; comparing the number to an expected number of transaction records for a sample activity; and calculating the popularity based on the comparison.

In this manner, particularly popular activities can be identified among similar users.

Alternatively, the popularity of each activity can be assessed by: determining the number of transaction records linked to unique users where such users have repeatedly conducted the activity during a period; and calculating the popularity based on the comparison of the number of unique users that have conducted the activity once or twice or multiple times.

Alternatively, the popularity of each activity can be assessed by: determining the number of transaction records linked to unique users which are related to the activity over a first period; comparing the number to the number of transaction records which are related to the activity over a second period prior to the first period; and calculating the popularity based on the comparison.

In this manner, an activity which has recently become popular can be identified. This indicates that the user probably would not be aware of the activity, and therefore information related to the user may be particularly useful.

In some embodiments, calculating the locality for the user comprises: identifying one or more locations for the user; determining a radius for each location; and calculating the locality based on each location and the radius for the location. Identifying one or more locations may include: accessing transaction data associated with the user, wherein the transaction data comprises location identifiers for each of one or more transactions; and assessing whether a location corresponding to each location identifier meets a threshold. Additionally or alternatively, one of the locations may include the user's current location. Determining a radius for each location can be based on one or more of: the activity; the user; and a subset of other users.

This reflects that most users are only willing to travel a certain distance for activities. Even if an activity is of great interest to the user, if it is too far away, the activity is likely not relevant. However, some activities may prompt a larger radius than other activities, and some users may be willing to travel further than other users. Each radius is therefore dependent on a number of factors.

Calculating the locality based on each location and the radius for the location may comprise: calculating a partial locality for each location based on the radius for the location; and combining the partial localities.

The distance a user is willing to travel is generally based on one or more central locations (such as the user's home or work) and a distance from the central locations. Thus the relevant area is the combination of those areas defined around each of those central locations (the partial localities of the user's home and work, in this example).

In some embodiments, providing information to the user comprises: displaying, in a user interface, at least one of the subset of the activities.

This allows the user to view the information in a convenient manner.

In a second aspect, there is provided a system, comprising: a processor; and a memory in communication with the processor, the memory having instructions which, when executed by the processor, cause the processor to perform a method according to the first aspect.

In a third aspect, there is provided a non-transitory computer-readable medium having instructions which, when executed by a computer, cause the computer to perform a method according to the first aspect.

BRIEF DESCRIPTION OF FIGURES

Examples of the present disclosure will now be described with reference to the accompanying drawings, where.

DETAILED DESCRIPTION

As noted above, the present description contains examples of methods for providing a user with information related to activities. As used in this description, the term "activity" should be construed broadly. An activity may include, for example and without limitation, concerts or theatre performances, eating at a specific restaurant, shopping at a particular shop or mall, flying to a destination, or running an application on a mobile device. In its broadest sense therefore, any act performable by or involving a person can fall within the definition of an activity.

Activities typically have a real-world component, generally by the person performing the activity in a location. Each activity is recorded as activity information in a database or another suitable computer-readable medium.

This enables activities to be analyzed using a computer-implemented method, in order to provide a user with information related to one or more activities.

Figure 1:
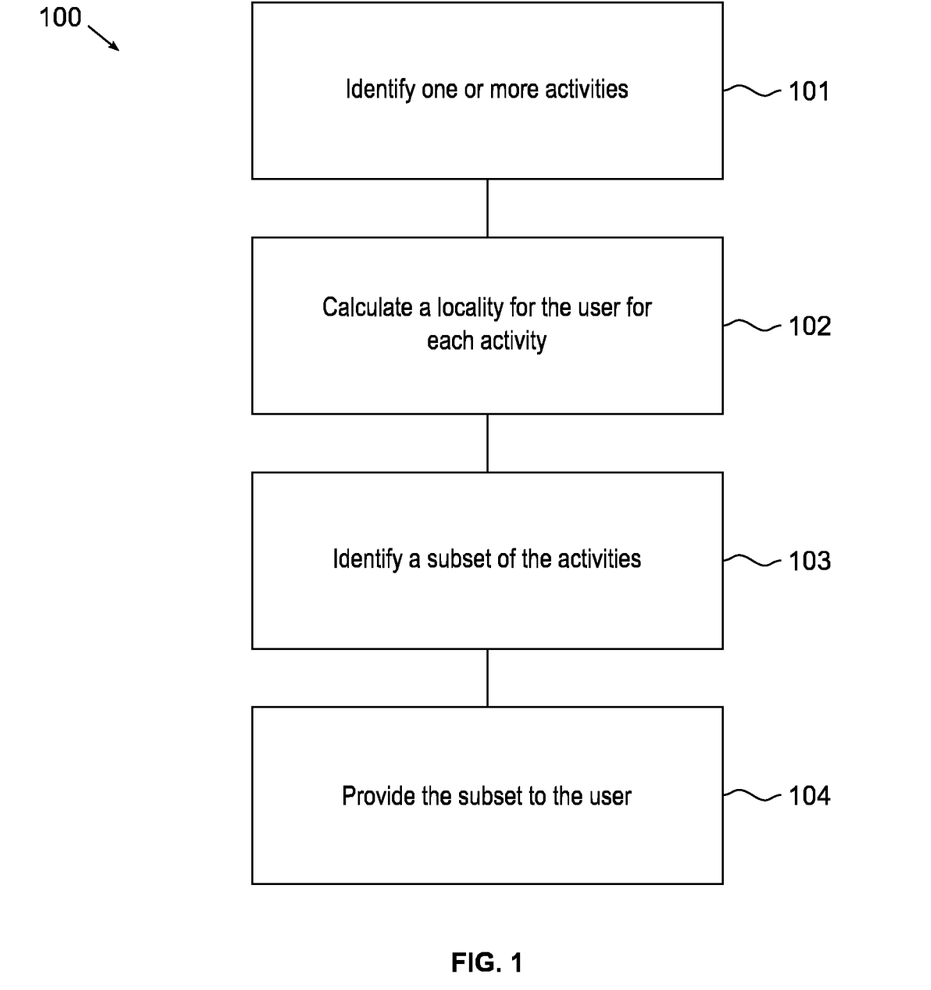
FIG. 1 shows an example of a method for providing a user with information related to one or more activities.

An example method 100 for providing a user with information related to one or more activities is shown in FIG. 1.

At step 101, one or more activities are identified. This involves analyzing transaction data, such as that produced when a user uses a credit card or other payment means to make a purchase related to the activity. Each transaction record in the transaction data typically identifies at least the vendor and the location of the transaction. From this, it can be possible to infer the nature of the activity that the transaction relates to.

Notably, each of the activities will generally not be associated with the user who is to be provided with information. This is because a user generally already knows about the activities he or she has already performed. The user therefore does not need to receive information related to his or her own activities. Instead, it is beneficial to provide a user with information related to activities performed by other users.

At step 102, a locality for the user is calculated for each activity. The locality reflects the likely distance that the user (and/or any other user) is willing to travel for the activity.

In this sense, a locality is a geographical area. The geographic area may be irregular. It is often based around a central location for the user. For example, the central location may be the user's home or workplace, or may reflect a location where the user typically performs transactions. The locality can be inferred as the area defined by a distance from the central location. The distance may be a geographical distance and/or may be based on travel time.

While each activity may have the same locality, it is common for each activity to have a different locality, even if they have the same central location. This may be based on the nature of the activity. For example, a large-scale public performance may have a much larger locality than a small restaurant.

Moreover, the locality may be based on the user. Some users may be willing to travel further than others. This could be inferred from the user's transaction data, such as those transaction records associated with the user that are related to a similar activity.

At step 103, a subset of the activities is identified. The identification of the subset is based on the respective locality for each activity. That is, the subset may be formed of only those activities that are located within a distance that the user is likely to be willing to travel (e.g., the "locality" of the user). Additionally or alternatively, the subset may be formed in any other fashion, such as those activities that the user is likely to perform.

At step 104, information related to at least one of the activities in the subset of the activities is provided to the user. The activity provided may be the activity that the user is most likely to perform, such that the provided information is customized to the user. This may be inferred based on the user's transaction records and/or based on the transaction records of other users. The activity and/or particular information related thereto can be provided in a user interface, such as on a mobile device of the user. By providing information on only one activity or only those activities most likely for the user to perform, the processing and data transfer requirements of the mobile device to receive such information are minimized.

SPECIFIC EXAMPLES

Method 100 provides an overview of an embodiment of the present disclosure. Specific examples of the method are provided in FIGS. 2 to 8. The details of each of these examples can be used in any combination.

Figure 2:
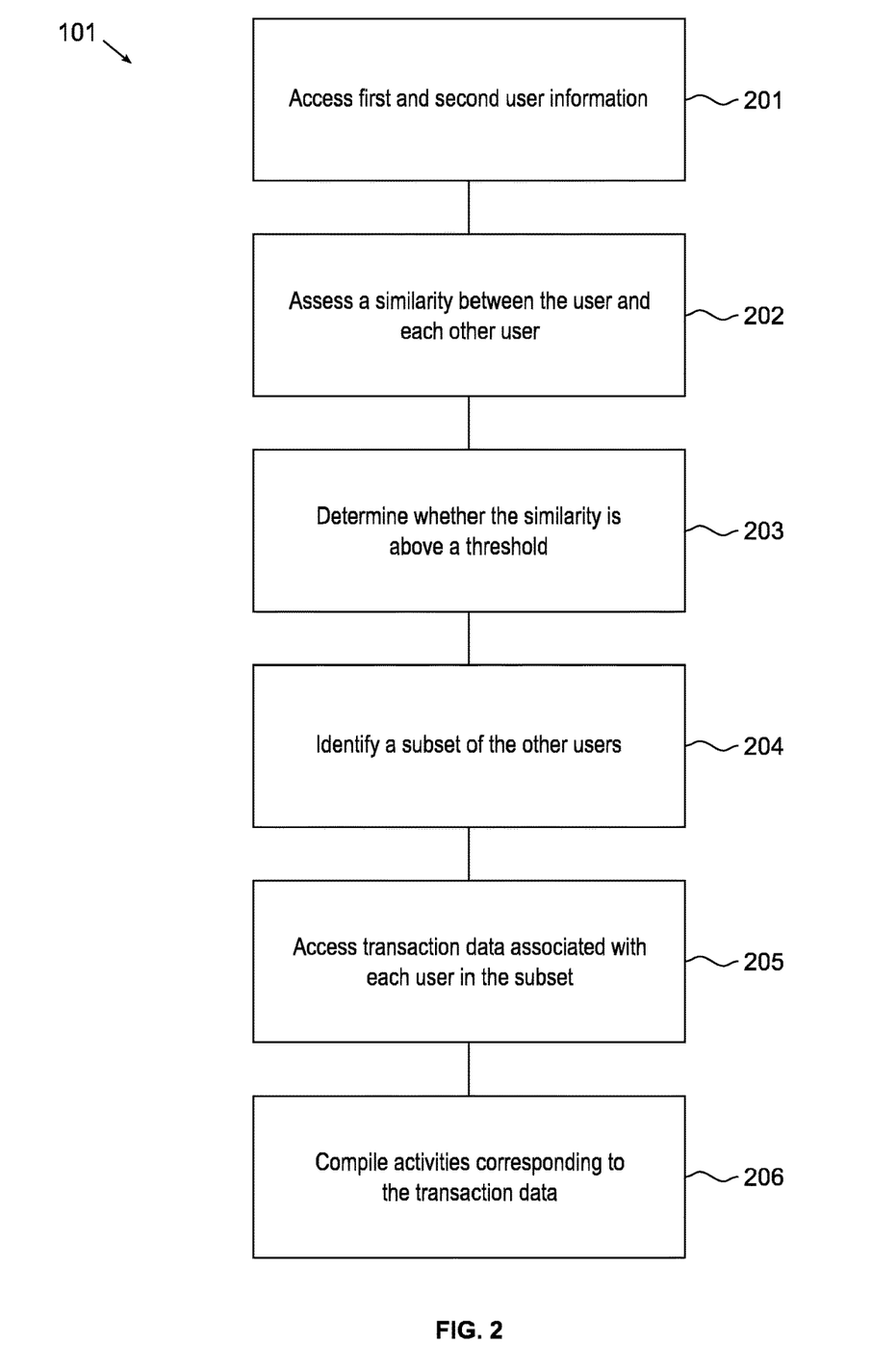
FIG. 2 shows a preferred method of identifying one or more activities.

As noted above, step 101 includes identifying one or more activities. An example of a method for doing so is shown in FIG. 2.

The method begins with comparing the user to one or more other users. The other users may be a set of users for which transaction data is available. For example, where method 100 is performed by a payment service provider, the other users may be subscribers to the payment services (or at least a subset of the subscribers).

Thus, at step 201, first user information related to the user and second user information related to each other user are accessed. The first user information and second user information can include one or more of transaction data relating to transactions performed by the respective user, personal data about the respective user, or location information related to locations visited by the user. In the example embodiment, any personally identifiable information (PII) associated with any user is stored and/or accessed in an anonymized, aggregated, and/or encrypted format.

At step 202, a similarity between the user and each other user is assessed. This is performed based on a comparison between the first user information and each second user information, and generally involves the use of a weighted formula. For example, if the user visits similar locations and tends to have similar transactions to a first other user, the user and the first other user may be rated as having a high similarity. In contrast, if the user visits very geographically distant locations and performs very different transactions from a second other user, the user and the second other user may be rated as having a low similarity. The similarity may be a category (such as high, medium, or low, which may be defined by numerical ranges) or a numerical value (such as 30% similarity). In some cases, the similarity may be a set of values (such as high transaction similarity and 60% location similarity), each of which corresponds to a different portion of the user information. In some cases, the similarity may be assessed separately for different aspects of the user's life, or in other words, for different types of activities. The user and a second user might have a high degree of similarity in the field of sports activities (such as both users liking golf and tennis), but might have a very low degree of similarity in the field of preferred cuisine (such as Argentinian steak in comparison with French seafood).

At step 203, whether the similarity between the user and each other user is above a threshold is determined. This is a simple comparison (that is, whether the numerical similarity is above the threshold).

In some cases, the threshold may include a range, having a lower bound and an upper bound. In this case, the comparison is whether the similarity value is above the lower bound and below the upper bound. This allows other users who are too similar to be excluded from the subset. Including users who are too similar may lead to "overtraining" or the like, where a user is not exposed to information on activities that are different from his or her usual activities.

At step 204, based on the determination, a subset of the users is identified. For example, if the similarity value of a first other user is 50% and the threshold is 40%, the first other user is admitted into the subset. In contrast, if the similarity value of a second other user is 15%, the second other user is excluded from the subset.

At step 205, transaction data associated with each user in the subset of users is accessed. The transaction data includes one or more transaction records associated with the user, each of which identifies an activity. Typically, where a transaction record is associated with a user, it means the user performed the corresponding activity (or at least a transaction linked to the activity). For example, if a transaction record relates to a clothing store, this indicates that the user likely performed the activity of purchasing clothing from that store.

If such transaction data was accessed at step 201 by obtaining it from a data store, there may be no need to reobtain it. Instead, the data may be kept in a suitable memory or the like for reuse.

At step 206, the activities corresponding to at least one transaction record in the transaction data are compiled. That is, a set of activities is compiled such that each activity in the set corresponds to at least one transaction record. These compiled activities therefore represent a set of activities performed by other similar users. Thus, when the user is provided information about these activities, it can reasonably be assumed that the activities will be of interest to the user, such that the user is likely to perform the activities.

Figure 3:
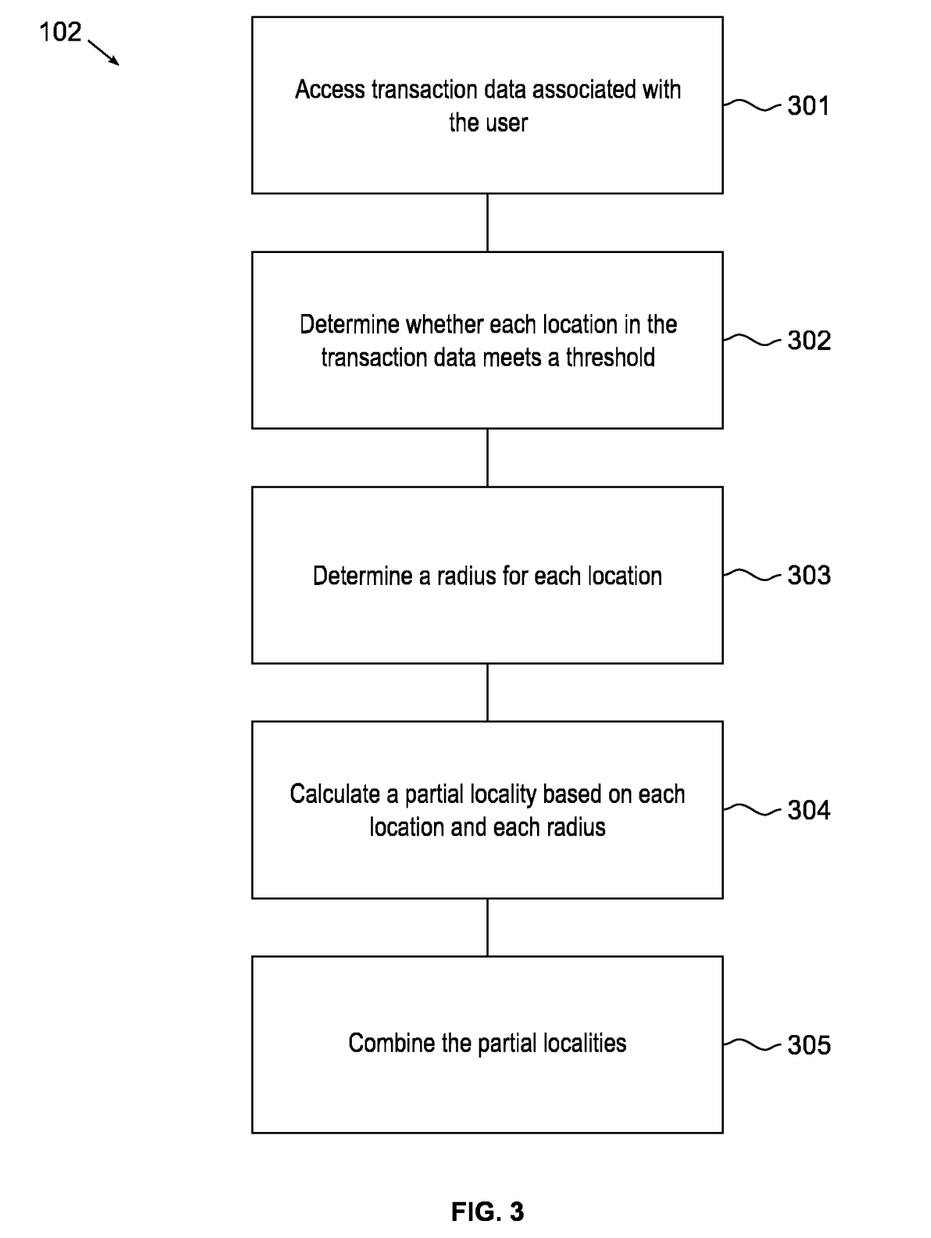
FIG. 3 shows a preferred method of calculating a locality for the user for an activity.

Once the activities are identified, step 102 involves calculating a locality for each of the activities. An example of a method for calculating a locality for a given activity is shown in FIG. 3.

The method begins with determining one or more locations for the user. Notably, the locations determined for the user may be a home, a workplace, and/or a common activity location, and may include the user's current location. Although these may be user input, this leads to a poor user experience and may result in inaccurate or out-of-date information. The user's current location can be determined on the basis of GPS data or the like, if the user carries about a suitable device (e.g., a mobile computing device such as a smart phone with GPS capabilities). However, such data is not necessarily linked to activities in any way, and therefore may be of limited value for use in method 100.

Thus at step 301, transaction data associated with the user is accessed. The transaction data comprises one or more transaction records, each of which identifies a location associated with the transaction. If such transaction data was obtained at step 201 by obtaining it from a data store, there may be no need to reobtain it. Instead, the data may be kept in a suitable memory or the like for reuse.

At step 302, whether a location identified in at least one transaction record meets a threshold is determined. That is, for each such location, the number of transactions occurring in the vicinity of that location is calculated. If this number does not meet a threshold, the location is excluded from further processing. This ensures that only those locations or areas that the user visits frequently are used to calculate a locality. If the user has only visited a certain location once, he or she may be unlikely to perform an activity near that location again.

The threshold may be predetermined or may be determined programmatically in order to ensure that the number of locations or areas processed in the further steps is at a reasonable level. For example, only the top three most popular locations may be used.

At step 303, a radius is determined for each location. The radius represents the distance from the location that the user would be willing to travel from the location for the activity. The distance may be a straight-line geographical distance, may be a travel distance that takes into account road topography, and/or may be a travel time (such as 30 minutes).

The radius can be determined as a function of two weighted parts. A first part corresponds to the average distance that other users have travelled to the activity. For example, if each other user has travelled an average of 10 km from his or her home to the activity, this value can form the first part. The second part corresponds to the distance that the user has travelled to similar activities. For example, if the activity is a theatre, and the user has previously travelled an average of 50 km to other theatres, this value can form the second part. The precise nature of the function (such as it being a weighted average) will be easily determinable by the skilled person.

At step 304, a partial locality is calculated for each location and each radius. The partial locality is the area from the location defined by the radius. This represents the area around each location that the user is expected to be willing to travel for the activity.

At step 305, the partial localities are combined. This typically involves a union of each of the partial localities. This union produces a locality for the user for the activity, which represents the total area where the user is expected to be willing to travel for the activity.

The method shown in FIG. 3 calculates a locality for a single activity. This method is therefore performed for each of the activities. However, steps 301 and 302 need not be performed for every activity, as the results of steps 301 and 302 are independent of the activity. Thus, whether there are multiple activities, it may be preferable to perform steps 301 and 302 once, and then repeat steps 303 to 305 for each activity.

Figure 4:
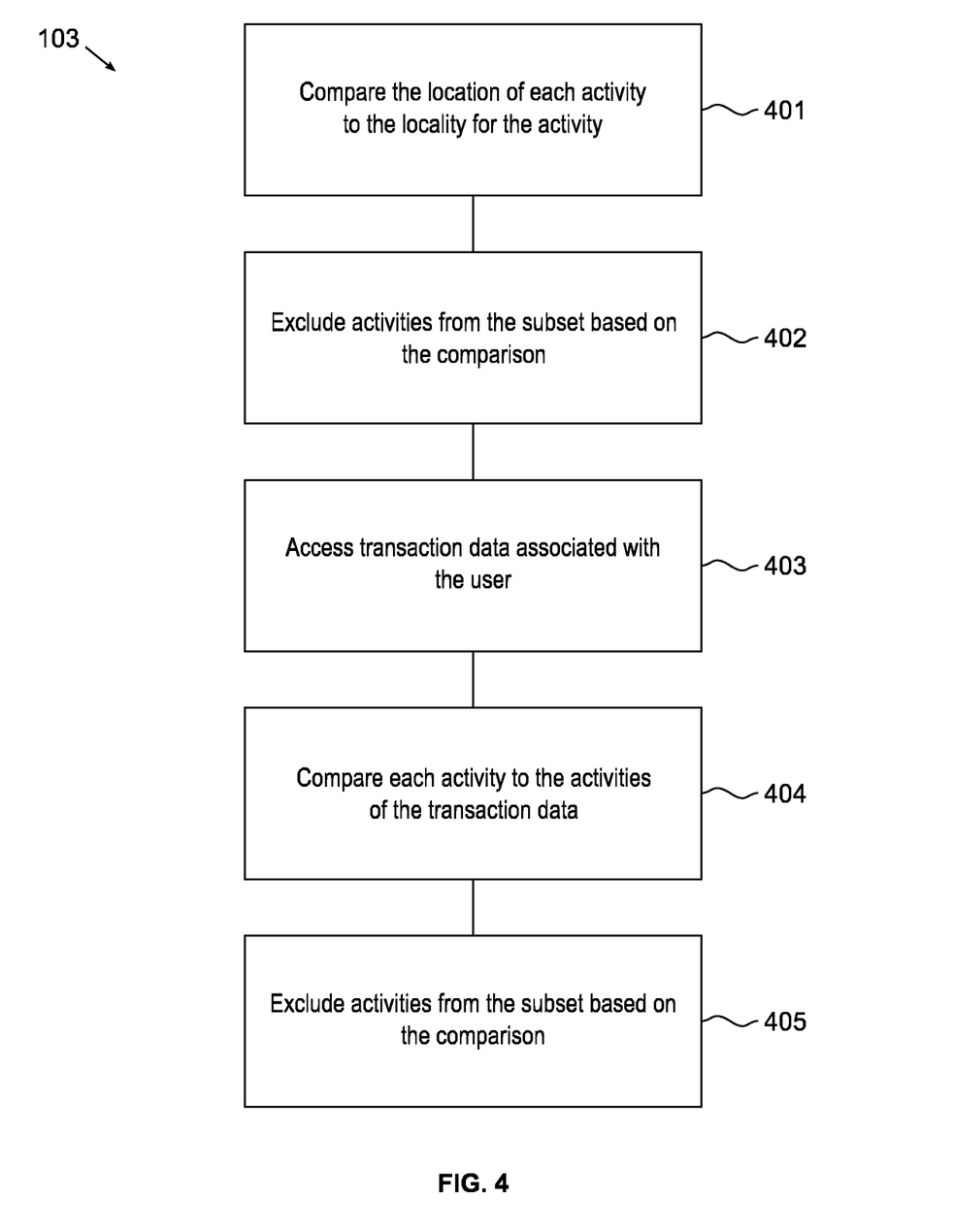
FIG. 4 shows a preferred method for identifying a subset of the activities based on the locality.

Once a locality has been calculated for each of the activities, this locality can be used to identify a subset of the activities that the user might wish to receive information regarding. Thus step 103 involves identifying a subset of the activities. An example of such a method is shown in FIG. 4.

Initially, the subset may be formed of every activity identified at step 101. Based on successive filters, the number of items in the subset may be reduced.

Thus, a locality filter can be applied to the subset. The locality filter is based on the localities calculated at step 102. The aim of the locality filter is to only retain activities to which the user would be willing to travel. For example, if an activity is located 100 km from a user's home, but the locality for the activity extends only to 20 km from the user's home, then the activity would be excluded from the subset by the locality filter.

Thus, at step 401, for each activity in the subset, the location of the activity is compared to the locality for the activity. In particular, it is determined whether the location of the activity is within the locality for the activity. In other words, it is determined whether the activity is within an area that the user is expected to be willing to travel to.

At step 402, based on the comparison, any activity that is outside of the locality is excluded from the subset. In this manner, only those activities that are located in an area to which the user is expected to be willing to travel are retained in the subset.

A novelty filter can then be applied to the subset. The novelty filter is used to ensure that the subset does not contain activities that have already been performed by the user.

Thus at step 403, transaction data associated with the user is accessed. The transaction data comprises one or more transaction records, each of which indicates an activity. This may be the same transaction data as that accessed in step 301. The transaction data accessed at step 301 may be stored in a memory or the like, and reused at step 403.

At step 404, each activity in the subset is compared to the transaction data. In particular, it is determined whether there is a transaction record in the transaction data that indicates each activity. In other words, it is determined whether the user has performed the activity before.

At step 405, based on the comparison, where a transaction record indicates an activity in the subset, that activity is excluded from the subset. Thus only new activities are retained in the subset once the novelty filter is applied.

It will be appreciated that the filters may be applied in a different order from that shown in FIG. 4. That is, steps 403 to 405 may be performed before steps 401 and 402.

Once the filters have been applied, the subset comprises only those activities that are suitable for use in subsequent steps of method 100.

Figure 5:
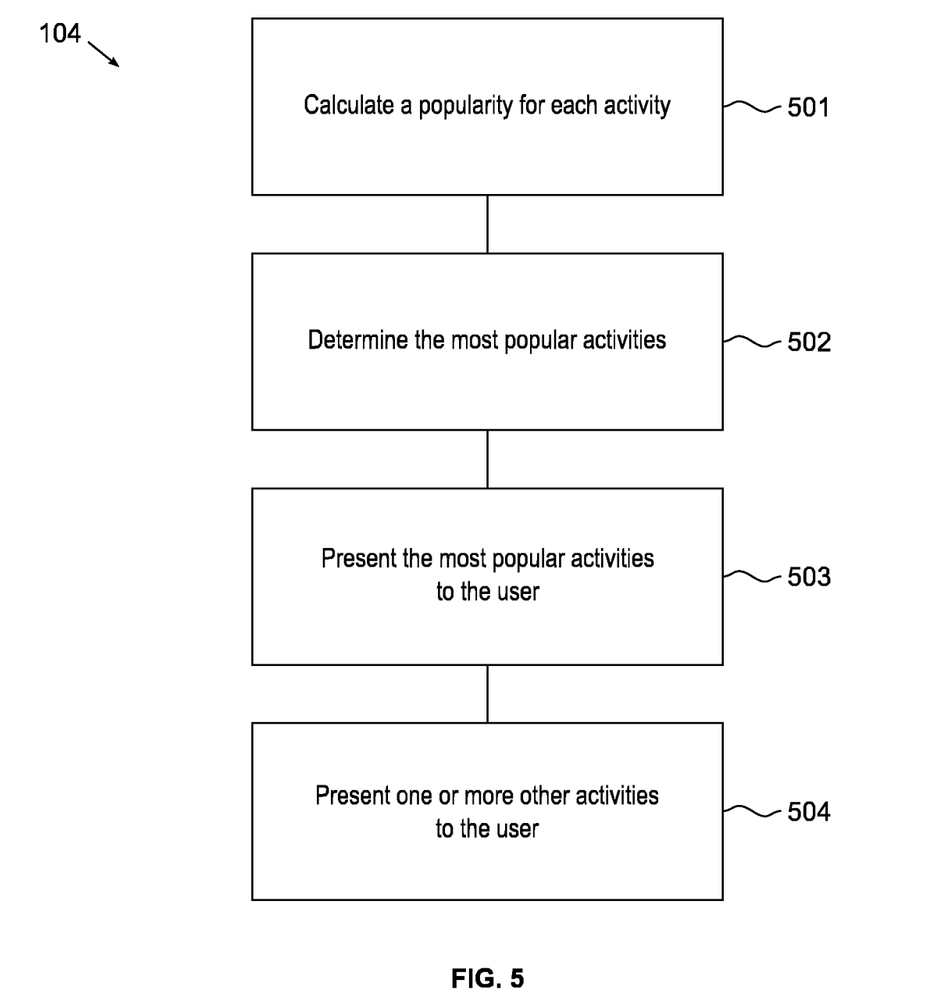
FIG. 5 shows a preferred method for providing the subset to the user.

Thus step 104 involves providing at least one of the activities in subset to the user, generally in a user interface. An example of such a method is shown in FIG. 5.

At step 501, the popularity of each activity in the subset is calculated. This may be done by any suitable method and generally is based on the popularity of each activity among other similar users. Two example methods are shown in FIGS. 6 and 7.

Figure 6:
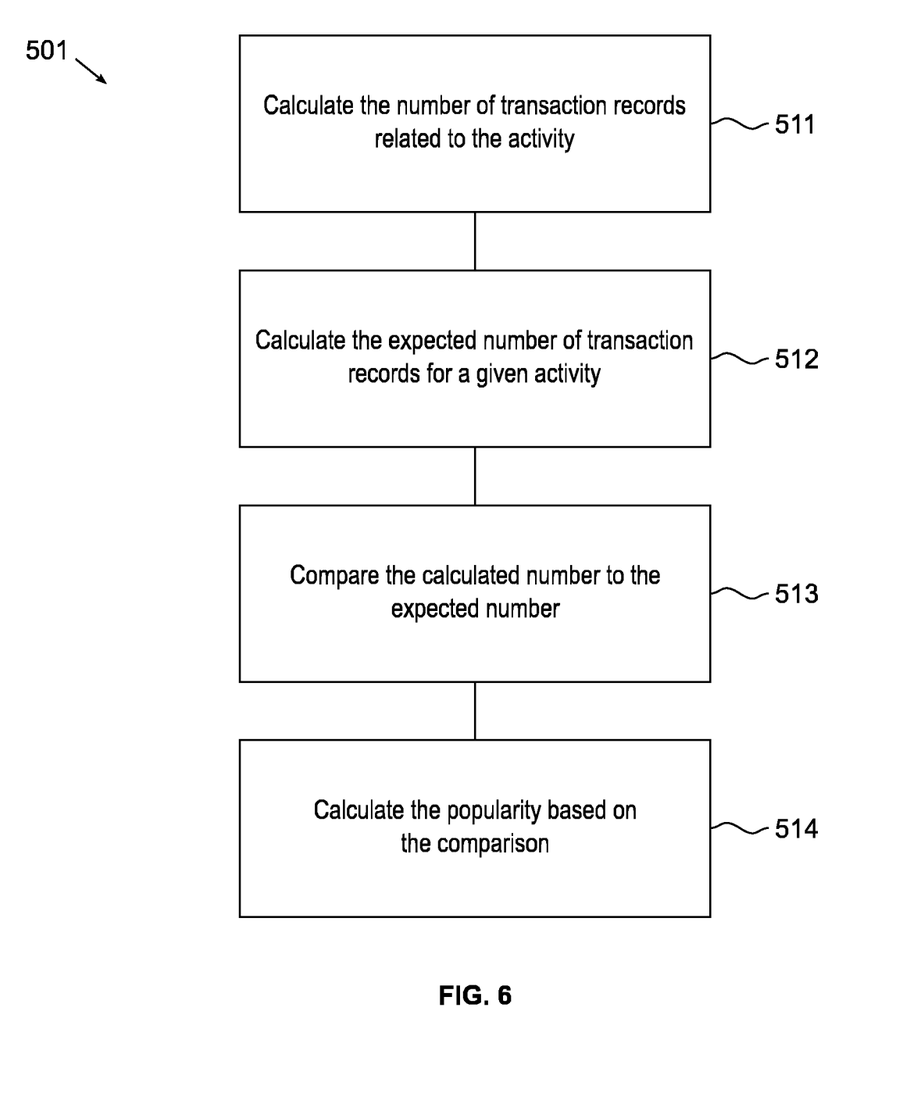
FIG. 6 shows a first preferred method for assessing a popularity of each activity.
Figure 7:
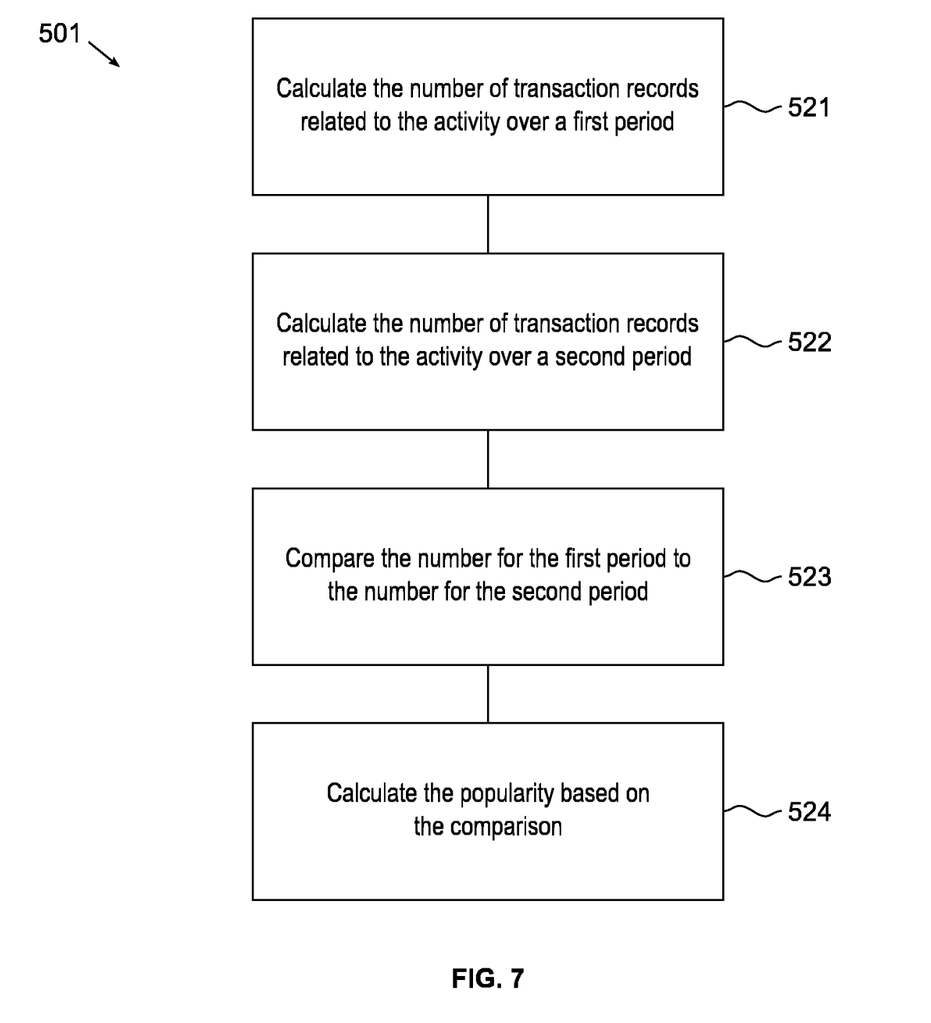
FIG. 7 shows a second preferred method for assessing a popularity of each activity.

FIG. 6 relates to a method for calculating the popularity of an activity based on the number of transactions.

Thus, at step 511, the number of transaction records in the transaction data related to the activity is calculated. The transaction data is the same as that accessed at step 205, in that it relates to the transaction date of the subset of other users.

At step 512, an expected number of transaction records for a given activity is calculated based on the transaction data. This would typically be the average number of transaction records for each unique activity in the transaction data. This provides a baseline against which it is possible to assess whether a given activity is more or less popular than average among similar users.

At step 513, the calculated number of transaction records is compared to the expected number of transaction records.

At step 514, the popularity of the activity is calculated based on the comparison. For example, the popularity may be the difference between the calculated number of transaction records and the expected number of transaction records. Alternatively, the popularity could be the proportional difference.

FIG. 7 relates to a method for calculating the popularity of an activity based on the number of transaction records over a period. The period may be selected to be sufficiently short such that recently popular activities are prioritized.

Thus, at step 521, the number of transaction records in the transaction data related to the activity and occurring within a first period is calculated. The transaction data is the same as that accessed at step 205, in that it relates to the transaction data of the subset of other users.

At step 522, the number of transaction records in the transaction data related to the activity and occurring within a second period preceding the first period is calculated. The first and second periods will typically be of equal length, such as both being 1 month.

At step 523, the number of records for the first period is compared to the number of records for the second period. Based on this comparison, a change in popularity among similar users over time can be assessed.

At step 524, the popularity of the activity is calculated based on the comparison. For example, the popularity may be the difference between the number of records for the first period and the number of records for the second period. Alternatively, the popularity could be the proportional change.

In any case, once a popularity is determined for each activity, the method continues with step 502. In step 502, a predetermined number of activities having the highest popularity is determined. Generally, the predetermined number will be one, so that only the most popular activity is determined.

At step 503, the most popular activity (and/or more than one most popular activity) is presented to the user, such as in a user interface. This may involve showing one or more of the name of the activity, the location of the activity, the cost of the activity, and the popularity of the activity. It should be understood that additional and/or alternative information about the activity may be provided to the user.

At step 504, one or more other activities may be shown to the user. The other activities may be the next most popular activities. Step 504 may occur in response to a user input from the user, for example, indicating that he or she is not interested in the activities presented at step 503, or that the user is interested in another category of activities, for example "entertainment" instead of "shopping".

In this manner, the user is presented with information related to activities that are relevant to him or her.

Systems

It will be appreciated that the described methods may be performed on any suitable processing system, including hardware or firmware. In some cases, each step may be performed by a module in a system.

Additionally or alternatively, any of the described methods may be embodied as instructions on a non-transitory computer-readable medium such that, when the instructions are executed by a suitable module within the system (such as a processor), cause the module to perform a described method.

Figure 8:
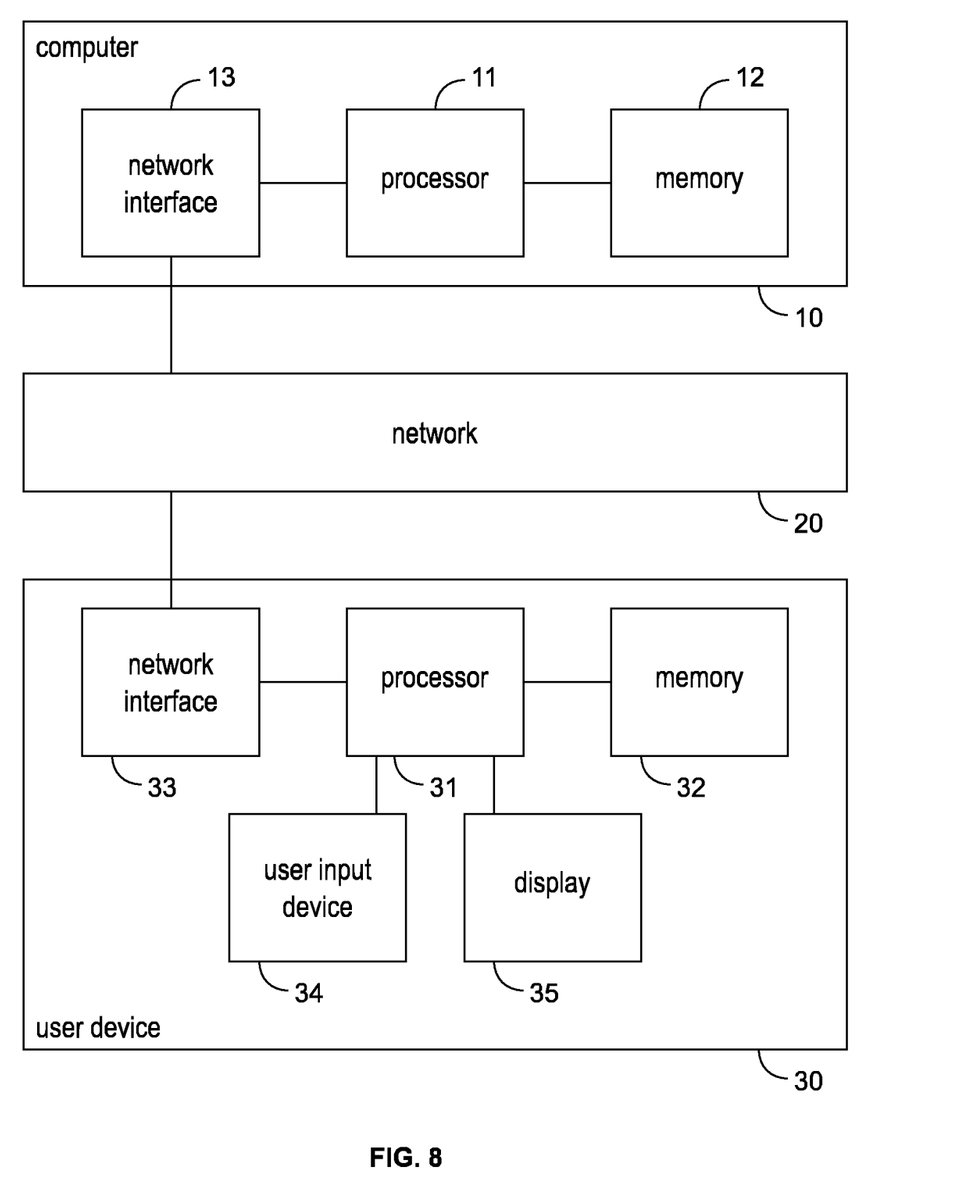
FIG. 8 shows an example system for implementing methods according to the present disclosure.

In a preferred embodiment, it will be appreciated that any of the described methods may be performed by a computer, such as the example computer shown in FIG. 8.

Computer 10, which may also be referred to as an activity analysis computing device, comprises a processor 11 in communication with a memory 12 and a network interface 13. The memory 12 typically comprises instructions that, when executed by the processor 11, cause the processor 11 to perform any of the methods described in the present description. The network interface 13 is configured to send and receive messages across a network 20, such as the internet.

Transaction data and other data used in the methods of the present description may be stored in the memory 12. Additionally or alternatively, it may be stored in a database remote from the computer 10. The data may be accessed by the processor 11 by sending a message via the network interface 13 across network 20 to the remote database, which, in response to the message, returns the data.

The computer 10 may be in communication with a user device 30 using network interface 13 across network 20. User device 30 comprises a processor 31 in communication with a memory 32, a network interface 33, a display 34 and a user input device 35. The user device 30 may optionally include a location sensor, such as a GPS transceiver, which is configured to calculate the location of the user device.

When computer 10 presents an activity (or any other data) to the user, this may be presented on the display of the user device 30. This is achieved by processor 11 sending a message to processor 31 via network interface 13, network 20 and network interface 33, instructing the processor 31 to display the activity. Likewise, if the user provides an input to the user device 30, this input may be transmitted to processor 11 by processor 31 via network interface 33, network 20, and network interface 13.

It will be appreciated that the order of performance of the steps in any of the embodiments in the present description is not essential, unless required by context or otherwise specified. Thus most steps may be performed in any order. In addition, any of the embodiments may include more or fewer steps than those disclosed.

Additionally, it will be appreciated that the terms "including" and "comprising" and grammatical variants must be interpreted inclusively, unless the context requires otherwise. That is, "comprising" and "including" should be interpreted as meaning "including but not limited to".

Moreover, the disclosure has been described in terms of various specific embodiments. However, it will be appreciated that these are only examples that are used to illustrate the disclosure without limitation to those specific embodiments. Consequently, modifications can be made to the described embodiments without departing from the spirit and scope of the disclosure.

The invention claimed is:

1. A method of providing a user with information related to one or more activities, the method implemented using an activity analysis computing device including a processor in communication with a memory, the method comprising:
   identifying the one or more activities;
   calculating a locality for the user for each activity based on a weighted average of i) an average distance that other users have travelled to the activity and ii) a distance that the user has travelled to similar activities that are not the activity itself;
   comparing a first set of transaction data of the user to a second set of transaction data of one or more other users to identify similar users having similar transaction data;
   identifying a subset of the activities by:
       filtering the one or more activities based on a popularity of the one or more activities in the similar transaction data of the similar users; and
       filtering the one or more activities by excluding activities that appear in transaction records of the first set of transaction data of the user; and
   providing information related to at least one activity of the subset of the activities to the user based on the calculated locality for the user for the at least one activity and the similar transaction data for the at least one activity, wherein the at least one activity has not been performed by the user.

2. The method of claim 1, wherein identifying one or more activities comprises:
   comparing the user with one or more other users;
   identifying a subset of the other users based on the comparison;
   accessing transaction data associated with each user in the subset of the other users, the transaction data comprising one or more transaction records, each transaction record identifying an activity; and
   compiling the one or more activities corresponding to at least one transaction record in the transaction data.

3. The method of claim 2, wherein comparing the user with one or more other users comprises:
   accessing first user information related to the user and second user information related to each other user; and
   assessing a similarity between the user and each other user based on the first user information and the second user information.

4. The method of claim 3, wherein identifying a subset of the other users comprises determining whether the similarity between the user and each other user is above a threshold.

5. The method of claim 1, further comprising:
   accessing transaction data associated with the user, the transaction data comprising one or more transaction records, each transaction record identifying an activity, wherein an activity is determined to be associated with the user if there is a transaction record identifying the activity in the transaction data associated with the user.

6. The method of claim 1, wherein providing information related to at least one activity of the subset of the activities to the user comprises:
   assessing a popularity of each activity of the subset of activities with respect to one another,
   wherein the user is provided with information related to at least one activity of the subset of activities based on the popularity of each activity.

7. The method of claim 6, wherein assessing a popularity of each activity comprises, for each activity:
   determining a number of transaction records linked to unique users that are related to the activity;
   comparing the number to an expected number of transaction records for a sample activity; and
   calculating the popularity based on the comparison.

8. The method of claim 6, wherein assessing a popularity of each activity comprises, for each activity:
   determining a first number of transaction records linked to unique users that are related to the activity over a first period;
   comparing the first number to a second number of transaction records that are related to the activity over a second period prior to the first period; and
   calculating the popularity based on the comparison.

9. The method of claim 1, wherein calculating the locality for the user comprises:
   identifying one or more locations for the user;
   determining a radius for each location; and
   calculating the locality based on each location and the radius for the location.

10. The method of claim 9, wherein identifying one or more locations comprises:
    accessing transaction data associated with the user, wherein the transaction data comprises location identifiers for each of one or more transactions; and
    assessing whether a location corresponding to each location identifier meets a threshold.

11. The method of claim 9, wherein determining a radius for each location is based on one or more of:
    the activity;
    the user; and
    a subset of other users.

12. The method of claim 9, wherein calculating the locality based on each location and the radius for the location comprises:
    calculating a partial locality for each location based on the radius for the location; and
    combining the partial localities.

13. The method of claim 1, wherein providing information to the user comprises:
    transmitting in a limited amount of data the information related to the at least one activity to a user device of the user; and
    displaying, in a user interface of the user device, the information.

14. A system comprising:
    a processor; and
    a memory in communication with the processor, the memory having instructions which, when executed by the processor, cause the processor to:
    identify one or more activities;
    calculate a locality for a user for each activity based on a weighted average of i) an average distance that other users have travelled to the activity and ii) a distance that the user has travelled to similar activities that are not the activity itself;

compare a first set of transaction data of the user to a second set of transaction data of one or more other users to identify similar users having similar transaction data;

identify a subset of the activities by:
- filtering the one or more activities based on a popularity of the one or more activities in the similar transaction data of the similar users; and
- filtering the one or more activities by excluding activities that appear in transaction records of the first set of transaction data of the user; and provide information related to at least one activity of the subset of the activities to the user based on the calculated locality for the user for the at least one activity and the similar transaction data for the at least one activity, wherein the at least one activity has not been performed by the user.

15. The system of claim 14, wherein the instructions further cause the processor to:
compare the user with one or more other users;
identify a subset of the other users based on the comparison;
access transaction data associated with each user in the subset of the other users, the transaction data comprising one or more transaction records, each transaction record identifying an activity; and
compile the one or more activities corresponding to at least one transaction record in the transaction data.

16. The system of claim 15, wherein the instructions further cause the processor to:
access transaction data associated with the user, the transaction data comprising one or more transaction records, each transaction record identifying an activity, wherein an activity is determined to be associated with the user if there is a transaction record identifying the activity in the transaction data associated with the user.

17. The system of claim 14, wherein to provide information related to at least one activity of the subset of the activities to the user, the instructions further cause the processor to:
assess a popularity of each activity of the subset of activities with respect to one another,
wherein the user is provided with information related to at least one activity of the subset of activities based on the popularity of each activity.

18. A non-transitory computer-readable storage medium having computer-executable instructions embodied thereon, wherein when executed by at least one processor coupled to a memory, the computer-executable instructions cause at least one processor to:
identify one or more activities;
calculate a locality for a user for each activity based on a weighted average of i) an average distance that other users have travelled to the activity and ii) a distance that the user has travelled to similar activities that are not the activity itself;
compare a first set of transaction data of the user to a second set of transaction data of one or more other users to identify similar users having similar transaction data;
identify a subset of the activities by:
- filtering the one or more activities based on a popularity of the one or more activities in the similar transaction data of the similar users; and
- filtering the one or more activities by excluding activities that appear in transaction records of the first set of transaction data of the user; and provide information related to at least one activity of the subset of the activities to the user based on the calculated locality for the user for the at least one activity and the similar transaction data for the at least one activity, wherein the at least one activity has not been performed by the user.

* * * * *

UNITED STATES PATENT AND TRADEMARK OFFICE
CERTIFICATE OF CORRECTION

PATENT NO. : 10,740,417 B2  
APPLICATION NO. : 15/246072  
DATED : August 11, 2020  
INVENTOR(S) : John Trencher et al.

It is certified that error appears in the above-identified patent and that said Letters Patent is hereby corrected as shown below:

On the Title Page

In item (72), in Inventors, delete "Vergari Fabiano" and insert therefor -- Fabiano Vergari --.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*